United States Patent
Lee et al.

(10) Patent No.: US 10,938,008 B2
(45) Date of Patent: Mar. 2, 2021

(54) BATTERY CELL TRAY INCLUDING VOLATILE CORROSION INHIBITOR

(71) Applicant: LG CHEM, LTD., Seoul (KR)

(72) Inventors: Je Jun Lee, Daejeon (KR); Do Gyun Kim, Daejeon (KR); Kwang Su Hwangbo, Daejeon (KR); Sang Sok Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 212 days.

(21) Appl. No.: 16/302,973

(22) PCT Filed: Jan. 12, 2018

(86) PCT No.: PCT/KR2018/000607
§ 371 (c)(1),
(2) Date: Nov. 19, 2018

(87) PCT Pub. No.: WO2018/131926
PCT Pub. Date: Jul. 19, 2018

(65) Prior Publication Data
US 2019/0280268 A1 Sep. 12, 2019

(30) Foreign Application Priority Data
Jan. 13, 2017 (KR) .................. 10-2017-0005952

(51) Int. Cl.
*H01M 2/10* (2006.01)
*B65D 5/50* (2006.01)
*B65D 71/70* (2006.01)
*B65D 77/04* (2006.01)
*C08F 10/06* (2006.01)
*C08J 5/18* (2006.01)
(Continued)

(52) U.S. Cl.
CPC .......... *H01M 2/1094* (2013.01); *B65D 5/503* (2013.01); *B65D 71/70* (2013.01); *B65D 77/04* (2013.01);
(Continued)

(58) Field of Classification Search
CPC ..................................... H01M 2/105
See application file for complete search history.

(56) References Cited

U.S. PATENT DOCUMENTS 6,033,599 A * 3/2000 Lozano ................. C23F 11/02
252/389.54
7,285,334 B1 10/2007 Yamashita et al.
(Continued)

FOREIGN PATENT DOCUMENTS

EP 1 916 276 A1 4/2008
JP 5-144425 A 6/1993
(Continued)

OTHER PUBLICATIONS

International Seerch Report (PCT/ISA/210) issued in PCT/KR2018/000607, dated May 11, 2018.

*Primary Examiner* — Robert S Carrico
(74) *Attorney, Agent, or Firm* — Birch, Stewart, Kolasch & Birch, LLP

(57) ABSTRACT

The present disclosure relates to a battery cell tray, which is a tray configured to accommodate a plurality of cylinder type battery cells in a storage of a first packaging member, including a first tray member having a plate type structure in which a plurality of first recessed portions surrounding one side end portions of the battery cells are formed; and a second tray member having a plate type structure in which a plurality of second recessed portions surrounding the other side end portions facing the one side end portions of the battery cells are formed, and the first and second tray members includes a volatile rust inhibitor which is vaporized at room temperature to form a rust-proofing film on surfaces of the battery cells.

14 Claims, 3 Drawing Sheets

(51) Int. Cl.
  *C08K 3/22* (2006.01)
  *C08K 3/28* (2006.01)
  *C09D 5/08* (2006.01)
  *C09D 133/00* (2006.01)
  *C09K 15/02* (2006.01)
  *C23F 11/00* (2006.01)
  *C08J 7/04* (2020.01)

(52) U.S. Cl.
  CPC ............... *C08F 10/06* (2013.01); *C08J 5/18* (2013.01); *C08J 7/0427* (2020.01); *C08K 3/22* (2013.01); *C08K 3/28* (2013.01); *C09D 5/084* (2013.01); *C09D 133/00* (2013.01); *C09K 15/02* (2013.01); *C23F 11/00* (2013.01); *H01M 2/105* (2013.01); *C08J 2323/12* (2013.01); *C08J 2433/00* (2013.01); *C08K 2003/2272* (2013.01)

(56) References Cited

U.S. PATENT DOCUMENTS

| | | | |
|---|---|---|---|
| 7,763,380 B2 | 7/2010 | Morita et al. | |
| 8,348,058 B2 | 1/2013 | Stottmeister | |
| 9,246,147 B2 | 1/2016 | Kishii et al. | |
| 2005/0191544 A1* | 9/2005 | Casanova | B65D 75/367 429/100 |
| 2014/0166532 A1 | 6/2014 | Sugimoto et al. | |
| 2016/0028054 A1 | 1/2016 | Moon | |
| 2016/0099439 A1 | 4/2016 | Lee et al. | |

FOREIGN PATENT DOCUMENTS

| | | | | |
|---|---|---|---|---|
| JP | 2002-256470 | A | | 9/2002 |
| JP | 2003068264 | A | * | 3/2003 |
| JP | 2010-15958 | A | | 1/2010 |
| JP | 5653527 | B2 | | 1/2015 |
| KR | 10-0574819 | B1 | | 4/2006 |
| KR | 10-1060378 | B1 | | 8/2011 |
| KR | 10-2014-0066336 | A | | 6/2014 |
| KR | 10-2016-0013344 | A | | 2/2016 |
| KR | 10-2016-0014079 | A | | 2/2016 |
| KR | 10-2016-0040018 | A | | 4/2016 |
| WO | WO 2005/047402 | A1 | | 5/2005 |
| WO | WO-2014081227 | A1 | * | 5/2014 ............. H01M 2/08 |

* cited by examiner

BATTERY CELL TRAY INCLUDING VOLATILE CORROSION INHIBITOR

TECHNICAL FIELD

The present disclosure relates to a battery cell tray having a volatile rust inhibitor.

BACKGROUND ART

Depletion of fossil fuel has brought about a great increase in the price of energy sources and increased interest in environmental pollution. Eco-friendly alternative energy sources are a necessity for the next generation. In this regard, a great deal of research into power production methods such as methods of producing nuclear energy, sunlight power, wind power, and tidal power is underway, and a power storage device for efficiently utilizing the produced energy is also attracting much attention.

Particularly, as mobile devices have been increasingly developed and the demand for such mobile devices has increased, the demand for secondary batteries has also sharply increased as an energy source for the mobile devices. Accordingly, much research into batteries satisfying various needs has been carried out.

Typically, in terms of the shape of a battery, the demand for a prismatic type secondary battery or a pouch type secondary battery which are thin enough to be applied to products, such as mobile phones, is very high. However, in terms of materials of the battery, the demand for lithium secondary batteries, such as lithium ion batteries and lithium ion polymer batteries, exhibiting high energy density, discharge voltage, and output stability is very high.

Further, the secondary battery may be classified based on a structure of an electrode assembly having a structure in which a positive electrode, a negative electrode, and a separator interposed between the positive electrode and the negative electrode are laminated. Typical examples are a jelly-roll type (wound type) electrode assembly having a structure in which long sheet type positive electrodes and negative electrodes are wound with a separator interposed therebetween, and a stacked type (laminated type) electrode assembly in which pluralities of positive electrodes and negative electrodes cut in units of a predetermined size are sequentially laminated with a separator interposed therebetween. Recently, in order to solve problems of the jelly-roll type electrode assembly and the stack type electrode assembly, as an electrode assembly having an advanced structure that is a mixed type of the jelly-roll type and the stacked type, a stacked/folded type electrode assembly having a structure in which unit cells in which a predetermined unit of positive electrodes and negative electrodes are laminated with a separator interposed therebetween, are positioned on a separation film, and are sequentially wound has been developed.

Particularly, a cylinder type battery cell including a jelly-roll type electrode assembly is easily manufactured and has advantage such as energy density per weight is high.

Generally, the cylinder type battery cell, in a process of transportation and storage of a completed product, in a state in which a plurality of the battery cells are accommodated and arranged in a tray capable of accommodating the battery cell, is stored in a separate package member, transported and stored.

In this case, a battery case and a cap assembly constituting the cylinder type battery cell include a metal, more particularly Fe material, thereby in the process of transportation and storage of the battery cell, when exposed to high temperature and humidity, the battery cell is vulnerable to corrosion.

Accordingly, in order to prevent corrosion of the battery cell, a desiccant such as silica gel may be included and packed in a package member.

However, the effect of including such a desiccant is low, thereby even though including a desiccant in the package member, corrosion occurred in a cylinder type battery cell is not effectively prevented.

Therefore, there is a demand for a technique capable of fundamentally solving the problems.

DISCLOSURE

Technical Problem

The present disclosure is provided to solve the above technical problems of the related art.

The inventors of the present disclosure have conducted intensive research and various experiments and have found that, by including a volatile rust inhibitor to tray members, the volatile rust inhibitor is vaporized at room temperature to form a rust-proofing film on the surfaces of the battery cells, corrosion occurring during transportation and storage of the cylinder type battery cells may be effectively suppressed. Further, since the volatile rust inhibitor is included in tray members positioned on both sides of the battery cells, the volatile rust inhibitor may be vaporized to easily form the rust-proofing film on all parts of the battery cell, thereby completing the present disclosure.

Technical Solution

According to an aspect of the present disclosure, there is provided a battery cell tray, which is a tray configured to accommodate a plurality of cylinder type battery cells in a storage of a first packaging member, the battery cell tray including: a first tray member having a plate type structure in which a plurality of first recessed portions surrounding one side end portions of the battery cells are formed; and a second tray member having a plate type structure in which a plurality of second recessed portions surrounding the other side end portions facing the one side end portions of the battery cells are formed, wherein the first and second tray members include a volatile rust inhibitor which is vaporized at room temperature to form a rust-proofing film on surfaces of the battery cells.

Accordingly, since the volatile rust inhibitor is vaporized at room temperature to form the rust-proofing film on the surfaces of the battery cells, corrosion occurring during transportation and storage of the cylinder type battery cells may be effectively suppressed. Further, since the volatile rust inhibitor is included in the tray members positioned on both sides of the battery cells, the volatile rust inhibitor may be vaporized to easily form the rust-proofing film on all parts of the battery cell.

In one specific example, the cylinder type battery cell may include a battery case configured to accommodate an electrode assembly and a cap assembly coupled to the battery case to seal the battery case, and materials of the battery case and the cap assembly may include an iron (Fe) element.

That is, the battery cell tray according to the present disclosure may exhibit a more excellent effect when the materials of the battery case and the cap assembly constituting the cylinder type battery cell include the iron (Fe) element which is vulnerable to corrosion.

Here, at least a part of surfaces of the battery case and the cap assembly may be nickel plated.

Accordingly, a corrosion-preventing effect in the battery case and the cap assembly may be further maximized by the nickel plating.

Further, the volatile rust inhibitor may act to prevent an inside of the battery case from being further oxidized by forming the rust-proofing film on the surface of the battery case or inducing surface oxidation of the materials of the battery case.

In other words, the volatile rust inhibitor may induce surface oxidation of the battery case materials to prevent the inside of the battery case from being further oxidized by forming the rust-proofing film by itself on the surface of the battery case or reacting with the iron (Fe) element of the materials of the battery case.

Further, the volatile rust inhibitor may be $NaNO_2$, and the rust-proofing film may include gamma-iron trioxide ($\gamma$-$Fe_2O_3$).

More specifically, the $NaNO_2$ is slowly oxidized to $NaNO_3$ in air, and the $NaNO_2$ and $NaNO_3$ react with moisture in the air to form $HNO_2$ and $HNO_3$ in a high temperature and high humidity environment.

Here, the $HNO_3$ may finely oxidize the surface of the battery case or the cap assembly including the iron (Fe) element, and more specifically, may form gamma-iron trioxide ($\gamma$-$Fe_2O_3$) with a thickness of about 40 to 100 Å.

Accordingly, the gamma-iron trioxide ($\gamma$-$Fe_2O_3$) formed on the surface of the battery case or the cap assembly acts as the rust-proofing film, thereby effectively preventing further corrosion.

In one specific example, the volatile rust inhibitor may be included in the tray members by being mixed with materials of the tray members in a manufacturing process of the first and second tray members.

That is, the volatile rust inhibitor may be included as one of elements constituting the tray members by being added into a mold configured to form the tray members in a state of being mixed with the materials of the tray members.

The materials constituting the tray members of the present disclosure may include one, or a mixture of two or more selected from the group consisting of polypropylene, polyethylene, polyethylene terephthalate, polybutylene terephthalate, and Teflon. However, the materials constituting the tray members most preferably include polypropylene, polyethylene, or a mixture thereof. In order to manufacture the tray member using the polyethylene terephthalate or the polybutylene terephthalate, it is usually necessary to perform molding at a high temperature of about 220 to 260° C., which may deteriorate an effect of the volatile rust inhibitor. On the other hand, when the tray member is manufactured using the polypropylene, the polyethylene, or a mixture thereof, it is possible to sufficiently perform molding at a temperature of 150° C. or less, and thus the effect of the volatile rust inhibitor may be superior to that of the above-described materials.

In such a case, the volatile rust inhibitor may be included in a range of 1% to 30% based on the total weight of the material of the first and second tray members.

When the volatile rust inhibitor is included in an excessively small amount outside the above range, the effect to be exhibited through the volatile rust inhibitor may not be sufficiently achieved.

On the other hand, when the volatile rust inhibitor is included in an excessively great amount outside the above range, the content of the volatile rust inhibitor in the materials constituting the tray members may be increased, and thus physical properties of the tray members such as elasticity and a mechanical strength may be changed so that an arrangement state of the cylinder type battery cells may not be stably supported.

In another specific example, at least one side of the first tray member and the second tray member facing the cylinder type battery cell may be coated with the volatile rust inhibitor.

In a method of coating the tray members with the volatile rust inhibitor during manufacturing the tray members, an area in which the volatile rust inhibitor can be in contact with a surface of the battery cell may be widened and thus the rust proofing may be more effective in comparison with a method of mixing the volatile rust inhibitor in a powder form into the materials of the tray members. Further, when the rust inhibitor is mixed with the materials of the tray members, a strength of the tray members may be deteriorated due to the rust inhibitor, but the coating method of the present disclosure may not have the problem caused by the introduction of the rust inhibitor.

In the present disclosure, the method of coating the tray members with the volatile rust inhibitor is as follows. Referring to FIG. 4, first, a sheet 10 made of polypropylene, polyethylene, or a mixed material thereof is prepared as a tray member. The prepared sheet 10 is coated with a volatile rust inhibitor 20. Thereafter, vacuum molding is performed to form a plurality of recessed portions surrounding one side end portions of battery cells, thereby completing the manufacturing process of the tray member of the battery cells.

In the above process, the tray member sheet may be coated with the volatile rust inhibitor by the known method, and generally, by a gravure coating method, a spray method, an immersion method, or the like. It is important to use a material with excellent air permeability as a binder for the coating so the rust inhibitor evaporates smoothly, and specific examples of the material may include one selected from the group consisting of polyacrylic, polyamide, cellulose nitrate, polyurethane, nitrile-butadiene rubber (NBR), and polyvinylidene fluoride (PVDF), or a mixture of two or more of these materials.

A solvent for the coating should be a solvent which does not damage the tray member sheet, and specific examples thereof may include one selected from the group consisting of ethyl acetate, toluene, isopropyl alcohol, acetone, and cyclohexanol, or a mixture of two or more of these materials.

A coating thickness of the rust inhibitor may be in a range of 3 to 50 μm, more preferably, in a range of 5 to 40 μm, and most preferably, in a range of 10 to 30 μm. When the thickness is smaller than 3 μm, the coating process may be difficult to perform, and when the thickness is greater than 50 μm, a coating film may peel off from the tray member sheet, which is not preferable.

Accordingly, the volatile rust inhibitor may be included in the tray members to exhibit a corrosion prevention effect by utilizing conventional tray members.

The sum of lengths of both side end portions of the battery cell which are inserted into a first recessed groove of the first tray member and a second recessed groove of the second tray member corresponding to the first recessed groove may be 30% to 70% of a length between both side end portions of the battery cell.

When the sum of the lengths of the both side end portions of the battery cell which are inserted into the first recessed groove of the first tray member and the second recessed groove of the second tray member corresponding to the first recessed groove is smaller than 30% of the length between the both side end portions of the battery cell, the lengths of the both side end portions of the battery cell which are inserted into the recessed grooves of the tray members become excessively short so that the arrangement state of the battery cells may not be stably supported or depth of the recessed grooves may be shortened to reduce surface areas of the tray members. Accordingly, a volatile tray member may not be sufficiently included so that the desired effect may not be achieved.

On the other hand, when the sum of the lengths of the both side end portions of the battery cell which are inserted into the first recessed groove of the first tray member and the second recessed groove of the second tray member corresponding to the first recessed groove is greater than 70% of the length between the both side end portions of the battery cell, the depth of the recessed grooves may be unnecessarily deepened to increase the surface areas of the tray members, thereby increasing material costs for forming the tray members.

The first tray member and the second tray member may have a planar width of 90% to 100% of a planar width of a storage of a first package member.

Accordingly, movements of the first and second tray members in the storage of the first package member may be minimized in a state in which the first tray member and the second tray member are positioned at each of the both side end portions of the battery cell so that movements of the battery cells packed by using the tray members and the first package member may be suppressed, and thus the battery cells may be more stably transported and stored.

When the planar widths of the first tray member and the second tray member are excessively small outside the above range, a fixed state of the first and second tray members may not be stably maintained in the storage of the first package member, and thus the arrangement state of the battery cells may not be stably supported.

On the other hand, when the planar widths of the first tray member and the second tray member are excessively great outside the above range, it may not be easy to position the tray members in the storage of the first package member.

In one specific example, the plurality of cylinder type battery cells may be arranged in a state of being spaced apart from adjacent battery cells at regular intervals.

Thus, each of the battery cells may be prevented from being damaged due to direct contact or interference with each other by eliminating or minimizing the direct contact or interference with each other.

The present disclosure provides a battery cell package member including the battery cell tray, wherein the battery cell package member may further include a second package member configured to accommodate the first package member in which the battery cell tray is accommodated in a sealed state to prevent the vaporized rust inhibitor from leaking out of the battery cell tray.

Accordingly, a loss of the vaporized rust inhibitor may be prevented by preventing the vaporized rust inhibitor from flowing out of the battery cell tray in the first package member so that a rust-proofing effect by the volatile rust inhibitor may be maintained for a longer period of time.

In such a case, the first package member may be made of paper having a predetermined thickness, and the second package member may be made of a polymer resin.

Accordingly, the first package member may more safely protect the battery cells and the battery cell tray therein in addition to reducing the weight of the battery cell package member, and the second package member may be flexibly deformed according to a shape of an outer surface of the first package member and exhibit better sealing performance.

Here, a sectional shape of the first package member may have a corrugated cardboard structure.

Accordingly, the first package member may more safely protect the battery cells and battery cell tray therein in addition to reducing the weight of the battery cell package member.

Further, the material of the polymer resin forming the second package member is not particularly limited as long as the polymer resin is capable of exhibiting flexible physical properties and a desired sealing effect, and specifically, may be polypropylene, oriented polypropylene, or polyethylene terephthalate.

Since the remaining structure of the battery cell tray or the package member except for the above-described configuration and structure is well known in the art, a detailed description thereof will be omitted in this specification.

Advantageous Effects

As described above, a battery cell tray according to the present disclosure is configured such that, by including a volatile rust inhibitor in tray members, the volatile rust inhibitor is vaporized at room temperature to form a rust-proofing film on the surfaces of the battery cells, corrosion occurring during transportation and storage of the cylinder type battery cells may be effectively suppressed. Further, since the volatile rust inhibitor is included in the tray members positioned on both sides of the battery cells, the volatile rust inhibitor may be vaporized to easily form the rust-proofing film on all parts of the battery cell.

Also, in a method of coating the volatile rust inhibitor during manufacturing the tray members, an area in which the volatile rust inhibitor can be in contact with a surface of the battery cell may be widened and thus the rust proofing may be more effective and a strength of the tray members may not be deteriorated.

DETAILED DESCRIPTION OF THE PREFERRED EMBODIMENTS

Hereinafter, exemplary embodiments of the present disclosure will be described in detail with reference to the drawings, and the scope of the present disclosure is not limited thereto.

Figure 1:
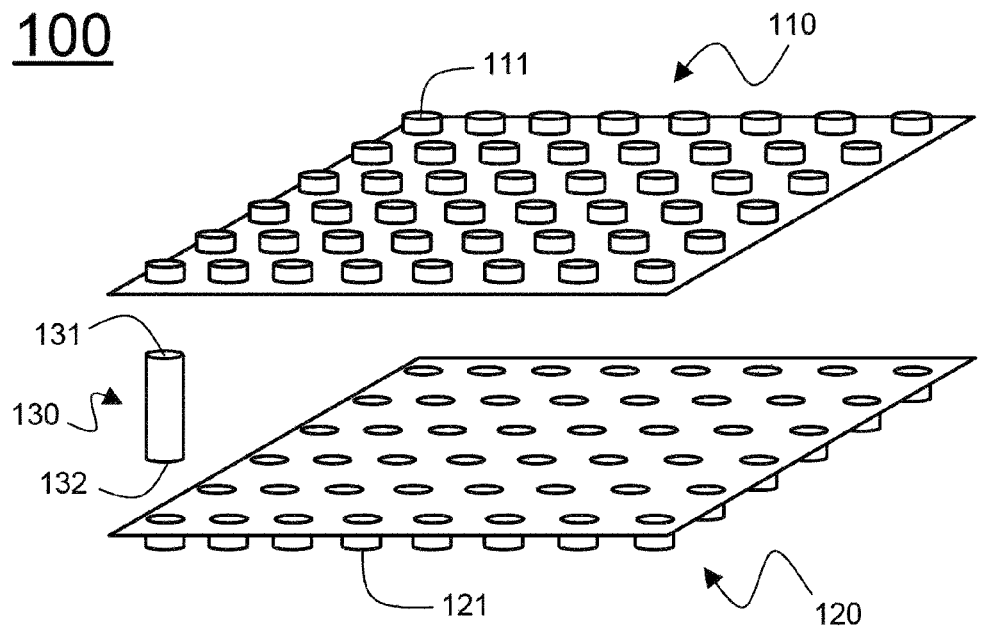
FIG. 1 is a schematic view showing a structure of a battery cell tray according to one embodiment of the present disclosure.

FIG. 1 is a schematic view showing a structure of a battery cell tray according to one embodiment of the present disclosure.

Referring to FIG. 1, a battery cell tray 100 includes a first tray member 110 and a second tray member 120, which are respectively disposed at one side end portion 131 and the other side end portion 132 of a cylinder type battery cell 130.

The first tray member 110 and the second tray member 120, which have a plate type structure, are formed with a plurality of first recessed portion 111 and second recessed portions 121, which surround the one side end portion 131 and the other side end portion 132 of the battery cell 130 facing each other.

Here, the one side end portion 131 and the other side end portion 132 of each of the plurality of cylinder type battery cells 130 facing each other are respectively inserted into the first recessed portion 111 of the first tray member 110 and the second recessed portion 121 of the second tray member 120. Accordingly, the plurality of cylinder type battery cells 130 are fixedly held and spaced apart from each other by a predetermined interval to be safely transported and stored while preventing damage due to interference or contact with each other.

Figure 2:
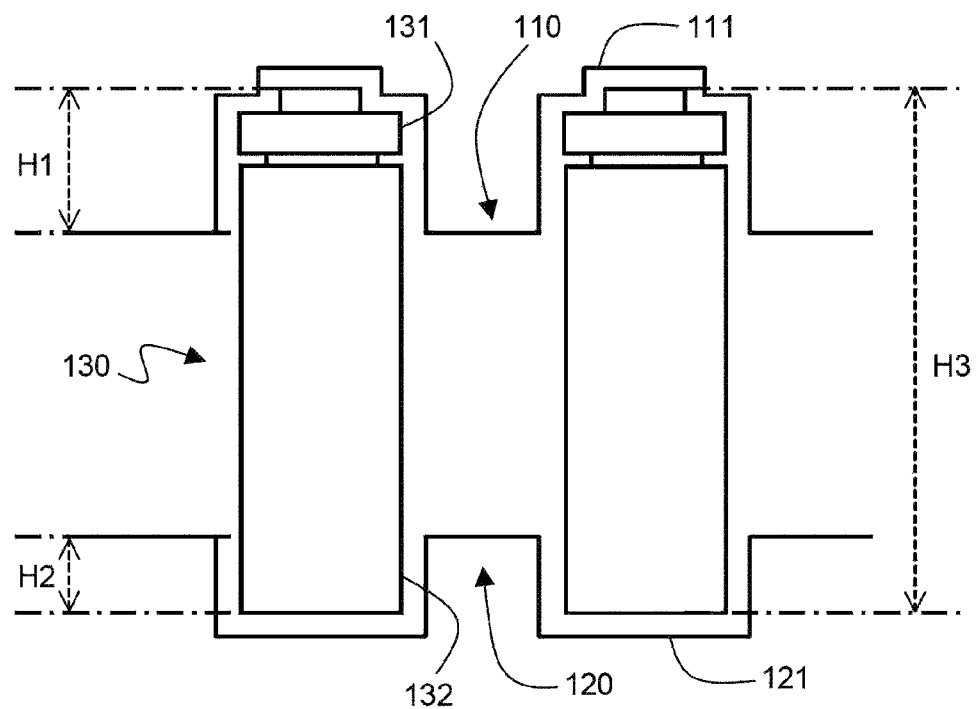
FIG. 2 is a schematic view showing a vertical sectional structure of the battery cell tray taken along line A-A' of FIG. 1.

FIG. 2 is a schematic view showing a vertical sectional structure of the battery cell tray taken along line A-A' of FIG. 1.

Referring to FIG. 2, the one side end portion 131 and the other side end portion 132 of the cylinder type battery cell 130 facing each other are respectively inserted into the first recessed portion 111 of the first tray member 110 and the second recessed portion 121 of the second tray member 120.

Accordingly, the cylinder type battery cell 130 is positioned between the first tray member 110 and the second tray member 120, and a volatile rust inhibitor included in the first tray member 110 and the second tray member 120 positioned at both side end portions 131 and 132 of the cylinder type battery cell 130 is vaporized at room temperature to form a rust-proofing film on a surface of the cylinder type battery cell 130.

The sum of a length H1 of the one side end portion 131 of the cylinder type battery cell 130 inserted into the first recessed portion 111 and a length H2 of the other side end portion 132 of the cylinder type battery cell 130 inserted into the second recessed portion 121 is about 40% of a length between the both side end portions 131 and 132 of the cylinder type battery cell 130.

Figure 3:
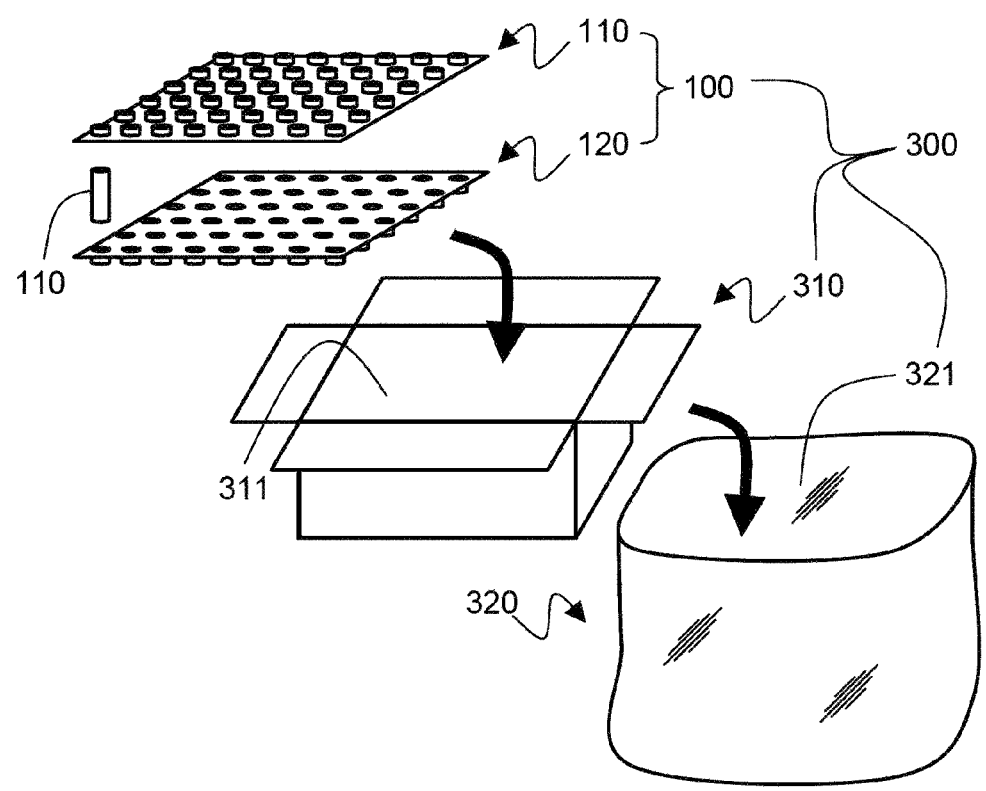
FIG. 3 is a schematic view showing a structure in which the battery cell tray of FIG. 1 is accommodated in a battery cell package member according to another embodiment of the present disclosure.

FIG. 3 is a schematic view showing a structure in which the battery cell tray of FIG. 1 is accommodated in a battery cell package member according to another embodiment of the present disclosure.

Referring to FIG. 3, a battery cell package member 300 includes a battery cell tray 100, a first package member 310, and a second package member 320.

The first package member 310 is made of a paper box having a sectional shape of a corrugated structure and includes a storage 311 configured to accommodate the battery cell tray 100 in which a plurality of cylinder type battery cells 130 are accommodated between a first tray member 110 and a second tray member 120.

The battery cell tray 100 is accommodated in the storage 311 of the first package member 310, and then the first package member 310 is accommodated in a storage 321 of the second package member 320.

The second package member 320 is made of a polymer resin and may be easily deformed into a shape corresponding to a shape of an outer surface of the first package member 310 due to flexible physical properties thereof.

Further, since the second package member 320 completely seal the storage 321 in a state of accommodating the first package member 310, a rust inhibitor vaporized in the first tray member 110 and the second tray member 120 may be prevented from flowing out to the outside of the second package member 320 so that a rust-proofing effect with a volatile rust inhibitor may be maintained for a longer period of time.

Hereinafter, the present disclosure will be described in detail with reference to examples of the present disclosure, but the scope of the present disclosure is not limited thereto.

Example 1

5 parts by weight of $NaNO_2$ powder was mixed with 100 parts by weight of a polypropylene resin, followed by an extrusion process to manufacture a polypropylene sheet having a thickness of 400 μm. Thereafter, a battery cell tray having the shape shown in FIG. 1 was manufactured by a vacuum forming method at a temperature of about 100° C.

Example 2

Figure 4:
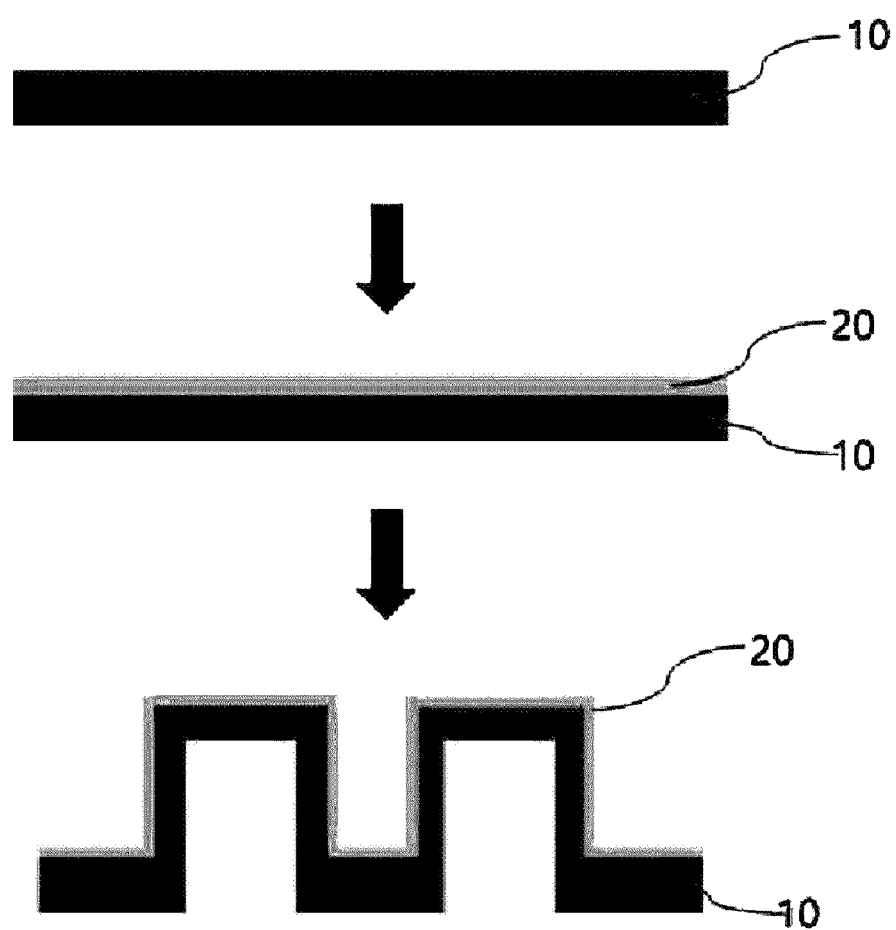
FIG. 4 is a schematic view showing a process of coating a volatile rust inhibitor on one side of a tray member.

The polypropylene sheet having a thickness of 400 μm was manufactured as shown in FIG. 4, 5 parts by weight of polyacryl as a binder and 5 parts by weight of $NaNO_2$ powder as a volatile rust inhibitor were added to 100 parts by weight of a toluene solvent and stirred to prepare a rust inhibitor solution. Then, the rust inhibitor solution was applied on the polypropylene sheet to a thickness of 20 μm and dried. Thereafter, a battery cell tray having the shape shown in FIG. 1 was manufactured by a vacuum forming method at a temperature of about 100° C.

Comparative Example

The same battery cell tray as in Example 1 was manufactured, except that the volatile rust inhibitor was not mixed.

Manufacturing of Battery Cell

A cap assembly including an iron (Fe) element was coupled to a battery case including an iron (Fe) element and sealed to manufacture a cylinder type battery cell in a state in which a wound type electrode assembly was impregnated with an electrolyte in the battery case.

<Experimental Example 1> Corrosion Prevention Effect 120 cylinder type battery cells were respectively accommodated in the battery cell trays manufactured in Examples 1 and 2 and Comparative Example, and the battery cell tray accommodating the cylinder type battery cells was sealed in a state of being accommodated in a storage of a first package member made of a paper box. The first package members, each thereof accommodate the battery cell trays manufactured in Examples 1 and 2 and Comparative Example 1, were stored in a chamber maintained at a temperature of 60° C. and a humidity of 95% for 7 days, and then the number of the cylinder type battery cells in which corrosion occurred was confirmed, and the results are shown in Table 1 below.

TABLE 1

|  | Battery Cell with Corrosion |
|---|---|
| Example 1 | 3 |
| Example 2 | 0 |
| Comparative Example 1 | 10 |

As shown in Table 1, in the case of Example 1 in which the battery cell tray included the volatile rust inhibitor, corrosion occurred in three cylinder type battery cells, and in the case of Example 2, no corrosion occurred on a surface of the cylinder type battery cell. On the other hand, in the case of Comparative Example in which the battery cell tray did not include the volatile rust inhibitor, it was confirmed that corrosion occurred on surfaces of the 10 cylinder type battery cells.

Therefore, it is confirmed that the volatile rust inhibitor included in the battery cell tray is vaporized at room temperature and reacted with the iron (Fe) element included in the battery case and cap assembly to finely oxidize the surface of the battery cell to form gamma-iron trioxide ($\gamma$-$Fe_2O_3$), and the gamma-iron trioxide ($\gamma$-$Fe_2O_3$) formed on the surface of the battery case or cap assembly acts as a rust-proofing film to prevent corrosion in the battery cell. It is also confirmed that the battery cell tray of Example 2 manufactured by applying a volatile rust inhibitor on the tray member has a more excellent rust-proofing effect than the battery cell tray of Example 1.

<Experimental Example 2> Tray Strength Evaluation

Specimens were manufactured by cutting the trays of Examples 1 and 2 and Comparative Example to a width of 12.7 mm and a length of 12.7 mm. A tensile strength of the specimens was measured by the method according to ASTM D638, and the results are shown in Table 2.

TABLE 2

|  | Tensile Strength (MPa) |
| --- | --- |
| Example 1 | 22.5 |
| Example 2 | 32.7 |
| Comparative Example 1 | 32.8 |

As shown in Table 2, it is confirmed that the tensile strength of Example 1 including the volatile rust inhibitor was lower than that of Comparative Example 1 which did not include the volatile rust inhibitor, and the tensile strength of Example 2 manufactured by a coating method is equivalent to that of Comparative Example 1.

Although the present disclosure has been described with reference to the accompanying drawings and embodiments thereof, it should be understood by those skilled in the art that various changes may be made without departing from the spirit and scope of the present disclosure.

The invention claimed is:

1. A battery cell package, comprising:
a plurality of cylinder type battery cells;
a first tray member formed of resin having a plate type structure in which a plurality of first recessed portions surrounding one side end portions of the plurality of cylinder type battery cells are formed;
a second tray member formed of resin having a plate type structure in which a plurality of second recessed portions surrounding the other side end portions facing the one side end portions of the plurality of cylinder type battery cells are formed; and
a layer comprising a volatile rust inhibitor and binder coated on the first tray and the second tray,
wherein the volatile rust inhibitor is vaporized at room temperature to form a rust-proofing film on surfaces of the battery cells.

2. The battery cell package of claim 1, wherein the cylinder type battery cell comprises a battery case configured to accommodate an electrode assembly, a cap assembly coupled to the battery case to seal the battery case and materials of the battery case and the cap assembly comprise an iron (Fe) element.

3. The battery cell package of claim 2, wherein at least a part of surfaces of the battery case and the cap assembly are nickel plated.

4. The battery cell package of claim 1, wherein the volatile rust inhibitor acts to prevent an inside of the battery case from being further oxidized by forming the rust-proofing film on the surface of the battery case or inducing surface oxidation of the materials of the battery case.

5. The battery cell package of claim 1, wherein the volatile rust inhibitor is $NaNO_2$.

6. The battery cell package of claim 1, wherein the rust-proofing film comprises gamma-iron trioxide ($\gamma$-$Fe_2O_3$).

7. The battery cell package of claim 1, wherein the materials constituting the tray members comprise polypropylene, polyethylene, or a mixture thereof.

8. The battery cell package of claim 1, wherein the sum of lengths of both side end portions of the battery cell which are inserted into a first recessed groove of the first tray member and a second recessed groove of the second tray member corresponding to the first recessed groove is 30% to 70% of a length between both side end portions of the battery cell.

9. The battery cell package of claim 1, wherein the first tray member and the second tray member have a planar width of 90% to 100% of a planar width of a storage of a first package member.

10. The battery cell package of claim 1, wherein the plurality of cylinder type battery cells are arranged in a state of being spaced apart from adjacent battery cells at regular intervals.

11. A battery cell package, comprising:
a plurality of cylinder type battery cells;
a first packaging member comprising:
a first tray member having a plate type structure in which a plurality of first recessed portions surrounding one side end portions of the plurality of cylinder type battery cells are formed; and
a second tray member having a plate type structure in which a plurality of second recessed portions surrounding the other side end portions facing the one side end portions of the plurality of cylinder type battery cells are formed,
wherein the first and second tray members comprise a volatile rust inhibitor which is vaporized at room temperature to form a rust-proofing film on surfaces of the battery cells; and
a second package member configured to accommodate the first package member in which the battery cell package is accommodated in a sealed state to prevent the vaporized rust inhibitor from leaking out of the battery cell package.

12. The battery cell package of claim 11, wherein the first package member is made of paper having a predetermined thickness,
and the second package member is made of a polymer resin.

13. The battery cell package of claim 12, wherein a sectional shape of the first package member is a corrugated cardboard structure.

14. The battery cell package of claim 12, wherein the material of the polymer resin is polypropylene, oriented polypropylene, or polyethylene terephthalate.

* * * * *